United States Patent [19]
Kelsey, Jr. et al.

[11] 3,905,911
[45] Sept. 16, 1975

[54] COPPER ACTIVATED HAFNIUM PHOSPHATE PHOSPHORS AND METHOD OF MAKING

[75] Inventors: Paul V. Kelsey, Jr., Blackburg, Va.; James E. Mathers, Ulster, Pa.

[73] Assignee: GTE Sylvania Incorporated, Stamford, Conn.

[22] Filed: Sept. 25, 1974

[21] Appl. No.: 509,285

[52] U.S. Cl. ............... 252/301.4 P; 252/301.4 F
[51] Int. Cl. .............................................. C09k 1/36
[58] Field of Search. 252/301.4 P, 301.4 R, 301.4 F

[56] References Cited
UNITED STATES PATENTS

| | | | |
|---|---|---|---|
| 3,025,423 | 3/1962 | Rimbach | 252/301.4 P X |
| 3,159,584 | 12/1964 | Wanmaker et al. | 252/301.4 P |
| 3,274,415 | 9/1966 | Thomas et al. | 252/301.4 P X |
| 3,328,620 | 6/1967 | Rimbach | 252/301.4 P X |
| 3,415,756 | 12/1968 | Rimbach | 252/301.4 P |

*Primary Examiner*—Jack Cooper
*Attorney, Agent, or Firm*—Norman J. O'Malley; William H. McNeill; Donald R. Castle

[57] ABSTRACT

Disclosed are hafnium phosphate phosphors activated by copper and having the general formula $Hf_3(PO_4)_4$:Cu wherein copper is present as about 0.005 to 25% by weight of the matrix.

The phosphors are prepared by forming a mixture of suitable sources of hafnium, phosphate and copper and first firing for about 30 minutes in a closed crucible at about 800°C. The cake formed thereby is mortared or ground and refired for about 30 minutes in a mildly reducing atmosphere at 1100°C. The finished phosphor emits green under the ultraviolet and cathode ray excitation and x-ray.

4 Claims, No Drawings

COPPER ACTIVATED HAFNIUM PHOSPHATE PHOSPHORS AND METHOD OF MAKING

BACKGROUND OF THE INVENTION

This invention relates to luminescent materials for use, for example, in fluorescent discharge lamps, high pressure mercury vapor lamps, cathode ray tubes and x-ray. More particularly, it relates to luminescent materials having the general formula $Hf_3(PO_4)_4$ Cu.

Phosphors are known products of commerce. It would be an advance in the art to increase the number of types and kinds of these useful materials.

OBJECTS AND SUMMARY OF THE INVENTION

Accordingly, it is an object of this invention to provide new luminescent materials.

It is another object of the invention to provide methods of making these materials.

These objects are accomplished in one aspect of the invention by a phosphor which comprises a matrix of $Hf_3(PO_4)_4$ having copper activation and wherein the copper comprises about 0.005 to 25% by weight of the matrix.

The phosphor is prepared by forming a substantially homogeneous mixture of an appropriate amount of a hafnium source; a phosphate source and a copper source. The mixture is first heated in a closed crucible and the cake formed thereby is mortared or ground and the mixture refired again under a mildly reducing atmosphere, such as steam. The finished phosphor luminesces green under ultraviolet, cathode ray excitation and x-ray.

DESCRIPTION OF THE PREFERRED EMBODIMENTS

For a better understanding of the present invention together with other and further objects, advantages and capabilities thereof, reference is made to the following disclosure and appended claims.

Referring now to the invention with greater particularity there is herein provided a green emitting phosphor having a matrix of $Hf_3(PO_4)_4$ activated by from about 0.005 to 25% copper by weight of the matrix. Preferably, the copper is present from about 0.01 to 5% by weight of the matrix.

The luminescent material is made by heating, at a temperature above 1,000°C, a mixture of compounds that will form a hafnium phosphate matrix on such heating, together with a compound that will yield the copper activator.

The compound or compounds of the activator can be added to the initial mixture in various forms such as the oxide, hydroxide, basic carbonate, nitrate, halide, phosphate, acetate, sulfate, etc. The preferred form is the acetate, $(CH_3COO)_2$ Cu . $H_2O$ The mixture of materials used to form the hafnium phosphate matrix on heating can be, for example, one or more of the oxide, oxychloride, hydroxide, basic carbonate, oxalate, nitrate, etc., together with compounds of phosphorus such as an acid or oxide. Preferably the compound of phosphorus is an ammonium phosphate with diammonium hydrogen phosphate $[(NH_4)_2HPO_4]$ being particularly preferred.

Additionally, an initial mixture can be prepared by co-precipitating the ingredients from an aqueous solution; e.g., by adding a solution of a soluble phosphate to a solution containing hafnium chloride and the chloride of the activator. For example, an initial mixture comprising hafnium and copper phosphates can be produced from a solution of the respective oxychloride and chloride by use of ammonium phosphate.

A moist reducing atmosphere during thermal preparation of the luminescent materials gives products which are brighter than those prepared by simply heating in open crucibles in a muffle furnace.

The following methods are described as exemplary. It is to be noted that the starting materials employed should be of the high degree of purity which is recognized in the art as necessary for the preparation of luminescent materials.

EXAMPLE I 40.9 g hafnium oxychloride ($HfOCl_2$)

19.8 g diammonium hydrogen phosphate $(NH_4)_2 HPO_4$ 9.95 g copper acetate $(CH_3COO)_2$ Cu . $H_2O$ are intimately mixed together and heated for 30 minutes at 800°C. in a closed crucible, then mortared or ground and reheated at 1,100°C for 30 minutes in a mildly reducing atmosphere or an atmosphere of steam. The resulting phosphor emits green under ultraviolet, cathode ray excitation and x-ray.

EXAMPLE II 34.8 g $HfOCl_2$ 17.6 g $(NH_4)_2 HPO_4$ 2.99 g $(CH_3COO)_2$ Cu . $H_2O$ are treated as in Example I. The resulting phosphor emits green under ultraviolet, cathode ray excitation and x-ray.

It will be seen from the above that there is herein provided a new and useful phosphor.

While there had been shown and described what are at present considered the preferred embodiments of the invention, it will be obvious to those skilled in the art that various changes and modifications may be made therein without departing from the scope of the invention as defined by the appended claims.

What is claimed is:

1. A luminescent composition of matter having a matrix of $Hf_3CPO_4)_4$ activated by copper corresponding to the formula $Hf_3(PO_4)_4$:Cu wherein the amount of copper is from about 0.005 to 25% by weight of said matrix, said composition luminescing green under ultraviolet, cathode ray or x-ray excitation.

2. The composition of claim 1 wherein said amount of copper is from about 0.01 to 5% by weight of said matrix.

3. A method of making the composition of claim 1 which comprises the steps of: mixing together appropriate amounts of a hafnium compound, a phosphate compound and a copper compound to form a mixture which yields said composition upon subsequent firing; firing said mixture in a closed crucible at about 800°C for about 30 minutes; and mortaring said mixture and refiring at about 1,100°C for about 30 minutes in a steam atmosphere.

4. The method of claim 3 wherein said hafnium compound is $HfOCl_2$; said phosphate compound is $(NH_4)_2HPO_4$; and said copper compound is $(CH_3COO)_2$ Cu . $H_2O$.

* * * * *

UNITED STATES PATENT OFFICE
CERTIFICATE OF CORRECTION

PATENT NO. : 3,905,911
DATED : September 16, 1975
INVENTOR(S) : Paul V. Kelsey, Jr. and James E. Mathers It is certified that error appears in the above–identified patent and that said Letters Patent are hereby corrected as shown below:

Col. 1, line 9: "$Hf_3(PO_4)_4$ Cu" should read --- $Hf_3(PO_4)_4$:Cu ---

Col. 2, line 45: "$Hf_3CPO_4)_4$" should read --- $Hf_3(PO_4)_4$ ---

Signed and Sealed this ninth Day of December 1975

[SEAL]

Attest:

RUTH C. MASON
*Attesting Officer*

C. MARSHALL DANN
*Commissioner of Patents and Trademarks*